United States Patent
Shekerjian et al.

[11] 3,748,538
[45] July 24, 1973

[54] ENCAPSULATED HIGH VOLTAGE POWER SUPPLY WITH DISCONNECTABLE HIGH VOLTAGE OUTPUT LEAD AND METHOD OF MAKING SAME

[75] Inventors: Hart Shekerjian; George A. Louis, both of Scottsdale, Ariz.

[73] Assignee: Motorola, Inc., Franklin Park, Ill.

[22] Filed: Mar. 30, 1972

[21] Appl. No.: 239,608

[52] U.S. Cl. ......... 317/118, 174/52 PE, 317/101 R, 321/8 R
[51] Int. Cl. ............................................. H05k 5/06
[58] Field of Search ................. 174/52 PE; 321/8 R, 321/15; 317/103, 101 R, 101 CC, 118, 120, 234 E, 234 F, 234 W

[56] References Cited
UNITED STATES PATENTS

| | | | |
|---|---|---|---|
| 3,148,280 | 9/1964 | Kleber | 174/52 PE |
| 3,984,864 | 12/1969 | Bernstein | 317/234 W |
| 3,638,073 | 1/1972 | Bernstein | 321/8 R |
| 3,611,061 | 10/1971 | Segerson | 317/234 E |
| 3,641,464 | 2/1972 | Crowhurst | 317/101 CC |
| 3,236,937 | 2/1966 | Harkness | 124/52 PE |
| 3,141,923 | 7/1964 | Henschke | 174/52 PE |

*Primary Examiner*—Herman J. Hohauser
*Assistant Examiner*—Gerald P. Tolin
*Attorney*—Vincent J. Rauner and Thomas G. Devine

[57] ABSTRACT

A self-contained, high-voltage power supply unit, and method of manufacture therefor, is set forth and described, which power supply unit is characterized by a disconnectable high-voltage output lead. The supply unit includes a high-voltage receptacle into which a tapered plug is inserted and maintained during encapsulation. The plug is removed thereafter and a cable serving as the high-voltage output lead may be inserted into electrical and mechanical engagement with the high-voltage receptacle member. The high-voltage output lead is maintained in its set position by a tapered split-ring ferrule providing a relatively close fit to the outside diameter of the high-voltage lead and which is force fitted into the channelway in the encapuslated material as formed by the tapered plug.

7 Claims, 7 Drawing Figures

PATENTED JUL 24 1973　　　3,748,538

ENCAPSULATED HIGH VOLTAGE POWER SUPPLY WITH DISCONNECTABLE HIGH VOLTAGE OUTPUT LEAD AND METHOD OF MAKING SAME

BACKGROUND OF THE INVENTION

The present invention relates in general to high-voltage supplies and more particularly to an encapsulated high-voltage power supply unit, and a method of manufacture thereof, suitable for television application and characterized by a disconnectable high-voltage output lead.

High-voltage power supplies such as those intended for television application are, of course, known in the art. It is customary to develop the high voltage or ultor supply voltage by the rectification of flyback pulses as produced by a portion of an associated horizontal deflection output transformer. In some receivers employing solid state devices where the impedances involved are somewhat lower, the involved circuitry must also step up the voltage to its final level in one or more discrete steps. One type of high voltage apparatus suitable for this purpose is commonly known as a "Tripler" and includes a plurality of passive electrical components in the form of capacitors and diode rectifiers. As such it is particularly adaptable for encapsulation for safety and other considerations.

In any event, such solid-state tripler power supplies comprise a suitable nonconductive housing in which the interconnected electrical components are positioned and then encapsulated with a suitable material, such as an epoxy compound, with only the associated input, ground, focus and output terminals or leads projecting from the composite assembly. The input, ground and focus terminals may be formed of solid metal strips or terminal posts and thus are quite suited to the encapsulation process. Such is not the case, however, for the high-voltage output lead. The high-voltage output lead is generally of a multi-strand construction so as to obtain the required flexibility and ordinarily is sheathed in a low temperature, double-insulated material, such as vinyl or the like. This material cannot be subjected to temperatures in excess of 80° C for any substantial length of time without it melting or drying out to an extent where cracking subsequently develops. On the other hand, conventional two-part epoxy potting compounds require a temperature on the order of 150° C for a fast cure. Accordingly, it has been necessary in the past to lower the oven temperature for curing the epoxy material encapsulating such high voltage supply units, thereby extending the cure time to as much as 20 to 24 hours.

Another problem with the prior supply units having "potted in" high-voltage output leads concerns the vulnerability of its insulation to breakage or cutting. The hard sharp edge of the meniscus formed by the epoxy materials may easily cut into the customary soft vinyl material if there is any undue movement of the high-voltage lead. The result of course, is that undesirable corona may very likely be generated in the receiver under operating conditions.

SUMMARY OF THE INVENTION

Accordingly, it is an object of the present invention to provide an improved, self-contained, epoxy filled, high-voltage power supply unit without the foregoing dificiencies.

A more particular object of the present invention is to provide such a solid-state high-voltage power supply unit of the foregoing type which includes a disconnectable high-voltage output lead.

Another object of the present invention is to provide a method of manufacturing a high-voltage supply unit of the foregoing type wherein an associated high-voltage output lead may be inserted at a time subsequent to the encapsulation process in accordance with the needs of the user.

Still another object of the present invention is to provide a high voltage power supply unit of the foregoing type which may be subjected to an encapsulation process having a relatively fast cure time without deleterious effects upon its perfomance characteristics.

The novel features which are believed to be characteristic of the present invention as well as other objects and advantages thereof are set forth with particularly in the appended claims. The invention itself, however, may be best understood by reference to the following description when taken in conjunction with the drawing, in which:

Figure 1:
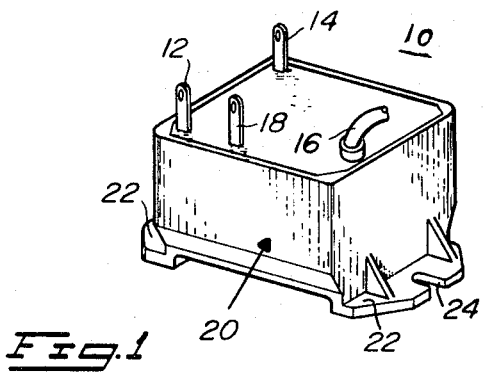
FIG. 1 is an elevational view in perspective of a solid-state high-voltage power supply unit suitable for television application and which incorporates the present invention.
Figure 2:
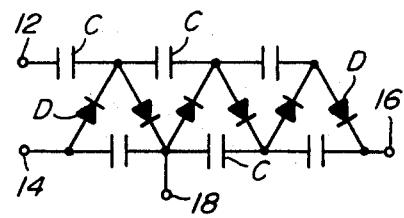
FIG. 2 is a schematic representation of a typical solid-state tripler high-voltage power supply unit.

Referring now to the drawings, a high-voltage power supply 10 as shown in FIG. 1 which has been constructed in accordance with the present invention. The illustrated power supply unit is a type commonly referred to as a "Tripler", a schematic of which is shown at FIG. 2. The supply 10 is comprised of a plurality of capacitors C and diode rectifiers D arranged in a ladder-type network as indicated. The supply 10 customarily includes an input terminal 12, a reference or ground terminal 14, a high-voltage output terminal or lead 16 and in most instances a focus terminal 18. The operation of such solid-state high-voltage tripler supplies are well understood in the art such that a detailed description of its operational characteristics should not be necessary. Specifically, the present invention relates to the manufacturing techniques of such a high-voltage power supply unit which includes a disconnectable high-voltage output lead or cable.

As previously pointed out, prior high-voltage supply units of the type shown at 10 in FIG. 1 conventionally included the high-voltage output lead as "potted in" along with the associated electrical components and the other access terminals serving as the input, ground and focus connection points. The latter are formed of substantially rigid, solid metal terminals or posts, such as shown at 12, 14 and 18 and thus are quite well suited for the intended encapsulation process. The high-voltage output lead is not because of the nature of its physical characteristics.

There are several disadvantages to soldering in the high-voltage output lead and simply potting in or encapsulating the same along with the other associated electrical components and reference terminals. As already mentioned, the high-voltage output lead is of a multi-strand construction for flexibility and is customarily sheathed in a low temperature threshold, double insulated material such as vinyl and Roulon, vinyl and vinyl, or equivalent materials. As such it cannot be subjected to the higher temperatures normally required for fast curing of the epoxy material used for encapsulation of the supply unit 10. Either the oven temperature for curing must be lowered to some value below 80° C, or the high voltage lead must run the risk of damage such as by melting or drying out to an extent that cracking may well likely occur at a subsequent time. Moreover, the vinyl insulation of the high voltage lead 16 can easily be cut by the sharp edge of the encapsulating material if no further protection is provided, giving rise to objectionable corona conditions in the television receiver.

However, a high-voltage supply unit 10 constructed in accordance with the present invention avoids the foregoing shortcomings by the expedient of making the high-voltage output lead entirely disconnectable from the supply unit proper. The potting or encapuslation process, including curing, is effected without the high-voltage output lead interconnected to the supply unit. The lead 16 is intended for insertion subsequent to the assembly process. This can be effected by the television set manufacturer in accordance with individual needs, such as selected lead lengths, particular materials and other factors. Moreover, the high-voltage output lead 16 can be removed and replaced if necessary at any time, including at all ultimate user's location if necessary. However, care must be taken with respect to the means and manner in which the high-voltage is made disconnectable, or the generation by corona will result.

Figure 3:
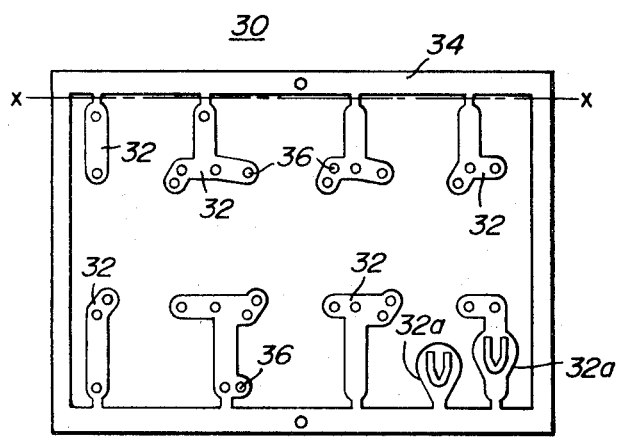
FIG. 3 is a top plan view of the lead frame upon which the electrical components of the high-voltage supply unit are mounted and soldered.
Figure 4:
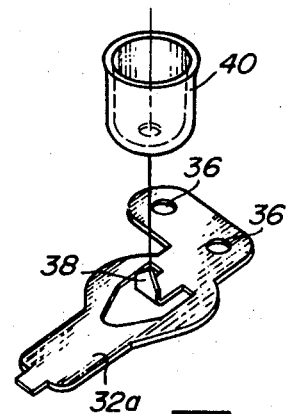
FIG. 4 is an enlarged view in perspective of a portion of the lead frame which illustrates an important aspect of the invention.

In fabricating the power supply unit 10, a lead frame 30 is incorporated upon which the individual electrical components and reference terminals are to be mounted and eventually soldered to form the network as shown in FIG. 2. As seen in FIG. 3, the lead frame 30 includes a plurality of metal tabs 32, projecting inwardly of a rectangular support member 34. Tabs 34 include one or more apertures 36 of a size to accomodate the electrical leads of the individual electrical components. Tabs 32 are shaped to a configuration to best facilitate all of the necessary interconnections for the electrical components and form a composite supply unit. At least one of such metal tabs however, as identified at 32a, includes a stamped or sharply lanced projection 38 extending upwardly (best seen in FIG. 4), the purpose of which will be described subsequently.

After the electrical components including the input ground and focus terminals 12, 14 and 18 have been mounted upon the frame 30 and suitably soldered, such as by automatic wave soldering apparatus (not shown), the outside support member 34 may be sheared off, for example, substantially along the lines X—X in FIG. 3.

This leaves the component parts mounted on the tabs 32, but self supporting by the plurality of solder connections. Prior to the soldering step, however, a small, cup-like member 40 of suitable conductive and solderable material such as brass or the like is seated over the lanced projection 38 of tab member 32a. This cup member 40 is likewise secured to its associated tab 32a during the soldering process. This provides an upstanding cylindrical receptacle, open at its top, with a spearhead shaped projection extending upwardly from the bottom.

Figure 6:
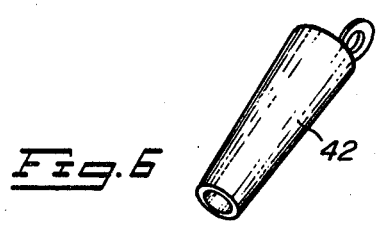
FIG. 6 is a view in perspective of a removable tapered plug used in the encapsulation process.
Figure 5:
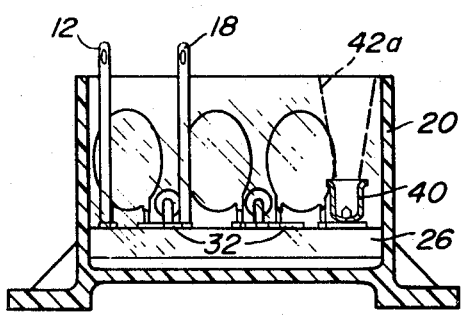
FIG. 5 is a cross-sectional view of the epoxy filled high-voltage power supply unit showing the electrical components mounted and encapsulated within an associated housing.
Figure 7:
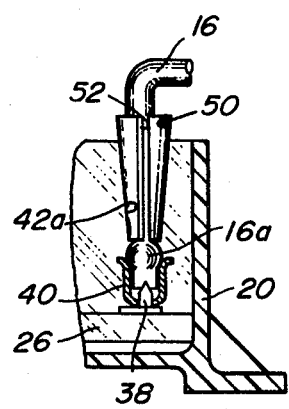
FIG. 7 is an enlarged partial view in elevation showing the high-voltage output lead as assembled as an integral part of the power supply unit.

The lead frame 30 with the assembled electrical components, including reference terminals 12, 14 and 18 and the seated cup member 40, is fitted into housing 20 with the tab members 32 and 32a resting on a pair of spaced rib members 26 extending longitudinally across the bottom of the housing 20 (best seen in FIGS. 5 and 7). Additionally, a stopper or plug, such as identified at 42 in FIG. 6, is partially inserted at its forward end into the cup member 40. The plug 42 is constructed with a slight tapering configuration having, for example, an included angle on the order of four to five degrees, and wherein the smaller forward end thereof is substantially the same dimension as the inside diameter of cup member 40. Insertion of plug 42 effectively seals off the interior of cup 40 during the encapsulation process. After the epoxy material poured into the interior housing 20 is suitably cured, the tapered plug 42 may be conveniently removed, leaving a tapered, access passageway or channel, as identified at 42a in FIG. 5, extending downwardly and into the interior of cup member 40. The tapered plug 42 is preferably constructed as a thermal plastic molded part of a suitably high temperature, self-lubricated material such as teflon or polypropylene. This high temperature capability is necessary to withstand the environment of relatively short curing time conditions and the self-lubrication characteristic facilitate the removal of the plug after the encapsulation process. Accordingly, the assembled power supply unit 10 is ready for inclusion of the associated high-voltage output lead 16, either at the fabrication site of the power supply manufacturer, or some different location such as the site of the television set manufacturer.

In assembling the high-voltage output lead 16, a tapered, split-ring ferrule 50 is employed having an inside diameter substantially as that of the outside diameter of the high-voltage output lead 16. The outside diameter of the ferrule 50 is made to substantially match the dimensions of the access channel 42a. Ferrule 50 further includes a small dimensioned slot 52, say on the order of one-sixteenth of an inch or so, extending along its full length thereof, as shown in FIG. 7. Ferrule 50 may be formed of any suitable flame-retardant plastic, either thermoset or thermoplastic.

After ferrule 50 is slipped over the end of lead 16, the wire is snipped off substantially flush with the forward end of ferrule 50 and then placed firmly in access channel 42a. The lead 16 itself is pressed down firmly to insure that a portion thereof enters the interior of cup 40 and comes into good electrical contact with the sharp projection 38 extending upwardly from the bottom of cup member 40. Finally, ferrule 50 is to be pressed in tightly by suitable means, such as a "horn" fitting, (which adequately clears lead 16) and perhaps an arbor press arrangement (not shown). Pressing the ferrule 50 downwardly into the formed channel 42 causes it to seat further down therein thus creating a "taper lock", and further creating a clamping action about the high-voltage output lead 16. A section of the vinyl insulation of output lead 16 extending beyond the leading edge of ferrule 50, identified at 16a, is forced to balloon outwardly to some extent. This seals out any voids that may otherwise be present between cup member 40 and the outside diameter of output lead 16 and, additionally, insures that lead 16 is adequately forced down into cup member 40 and onto the leading edge of projection 38. Finally, to eliminate any possibility of the high voltage output lead 16 from being cut by any sharp or pronounced edge, the ferrule 50 includes an oversized inner diameter at its top or flared end projection out of the encapsulation material in housing 20. With this constructional precaution and the assurance that good electrical contact is achieved between lead 16 and tab projection 38 on terminal 32a, arc-over and undesirable corona generation is effectively prevented. Moreover, the disconnectable capability of output lead 16 means that it may be easily removed and/or replaced at any time and at any place desired.

While the preferred embodiment of the invention has been herein illustrated and described, it will of course be understood that modifications and alternative constructions may be made within the scope and spirit of the invention as set forth in the appended claims.

Having thus described the invention, what is claimed is:

1. An encapsulated high-voltage power voltage power supply unit with disconnectable high-voltage output terminal, comprising in combination:
    a housing;
    a plurality of interconnected electrical components;
    mounting means for mounting said electrical components within said housing, said mounting means comprises a plurality of metal tabs in a common plane, through apertures therein;
    terminal means on said mounting means for forming a high-voltage output connection point,
    said terminal means includes a spear-shaped projection extending upwardly from one of said metal tabs into a cylindrically shaped receptacle member;
    encapsulating means for encapsulating said electrical components within said housing and having a channel or access to said high-voltage output terminal means;
    a lead for serving as the high-voltage output of the power supply; and
    connecting means for detachably connecting said high-voltage output lead to said high-voltage terminal means through said access channel.

2. An encapsulated high-voltage power supply unit in accordance with claim 1, wherein said connecting means include a tapered split-ring ferrule member of substantially the same dimensions as said access channel, positioned within said access channel, and having an inside diameter of a size to effect a friction to fit to a substantial portion of the outside diameter of said high-voltage output lead extending therethrough, said ferrule member providing a tapered lock upon insertion in said access channel.

3. An encapsulated high-voltage power supply unit in accordance with claim 2 wherein said tapered split-ring ferrule member is formed of a flame retardant thermo plastic material.

4. An encapsulated high-voltage power supply unit in accordance with claim 2 wherein said tapered split-ring ferrule member further includes an inside diameter opening at the end remote from said terminal means larger than the outside diameter of said high-voltage output lead.

5. The method of making an encapsulated high-voltage power supply unit having a disconnectable high-voltage output lead, comprising the steps of:
    providing a lead frame having a plurality of metal tabs extending inwardly of a support member in a common plane, at least one of which serves as a high-voltage connection point and includes a spear-shaped projection extending normal to said common plane;
    mounting electrical components on said metal tabs and affixing an open ended receptacle around said spear-shaped projection on said one metal tab;
    mechanically removing said support member and placing said assembled component parts in an associated housing;
    inserting a tapered plug formed of a high temperature, self-lubricated material in said high-voltage receptacle and encapsulating the interior of said housing;
    placing a tapered split-ring ferrule over one end of a lead to be utilized as the high-voltage output of the power supply unit;
    removing said tapered plug and replacing the same with said tapered split-ring ferrule through which said high-voltage output lead extends; and
    pressing down firmly on said split-ring ferrule to provide a taper lock within said housing and to force said high-voltage output lead down upon said projection in said high-voltage receptacle.

6. The method as defined in claim 5 wherein the step of mounting said electrical components on said metal tabs and affixing the open ended receptacle about said projection on said one metal tab includes the step of soldering the component parts.

7. The method as defined in claim 5 wherein the tapered split-ring ferrule is formed of a flame retardant, thermo plastic material.

* * * * *